US006987773B1

(12) United States Patent
Moritani

(10) Patent No.: US 6,987,773 B1
(45) Date of Patent: Jan. 17, 2006

(54) APPARATUS AND METHOD FOR TRANSFERRING DATA

(75) Inventor: Masamitsu Moritani, Yamatokoriyama (JP)

(73) Assignee: Sharp Kabushiki Kaisha, Osaki (JP)

( * ) Notice: Subject to any disclaimer, the term of this patent is extended or adjusted under 35 U.S.C. 154(b) by 0 days.

(21) Appl. No.: 09/566,293

(22) Filed: May 5, 2000

(30) Foreign Application Priority Data

May 11, 1999 (JP) ............................... P11-129532

(51) Int. Cl.
   *H04L 12/54* (2006.01)
(52) U.S. Cl. ...................................... 370/428; 370/412
(58) Field of Classification Search ................ 370/412, 370/401, 428, 392
   See application file for complete search history.

(56) References Cited

U.S. PATENT DOCUMENTS 4,918,597 A    4/1990   Krishman et al.
5,634,015 A *  5/1997   Chang et al. .............. 710/310
5,651,002 A *  7/1997   Van Seters et al. ......... 370/392
6,144,668 A * 11/2000   Bass et al. ................... 370/428

FOREIGN PATENT DOCUMENTS

DE    29820191 U1    1/1999
JP    59-139425      8/1984
JP    5-28082        2/1993

* cited by examiner

*Primary Examiner*—Brian Zimmerman
(74) *Attorney, Agent, or Firm*—David G. Conlin; David A. Tucker; Edwards & Angell, LLP

(57) ABSTRACT

An object of the present invention is to provide a general-purpose data transfer apparatus which enhances the operation efficiency of a data processing apparatus without a large-scale increase of circuits and has the same interface with respect to respective channels. A data transfer apparatus which selects a specific channel from among a plurality of channels connected thereto and outputs data from a data processing apparatus, has a first path which transfers data to a channel via an output buffer, and a second path which transfers data to a channel without the output buffer intervention, the data transfer apparatus comprising a data selection circuit which connects these two paths to different channels, respectively; and a transfer control circuit which controls data transfer of the two paths.

7 Claims, 2 Drawing Sheets

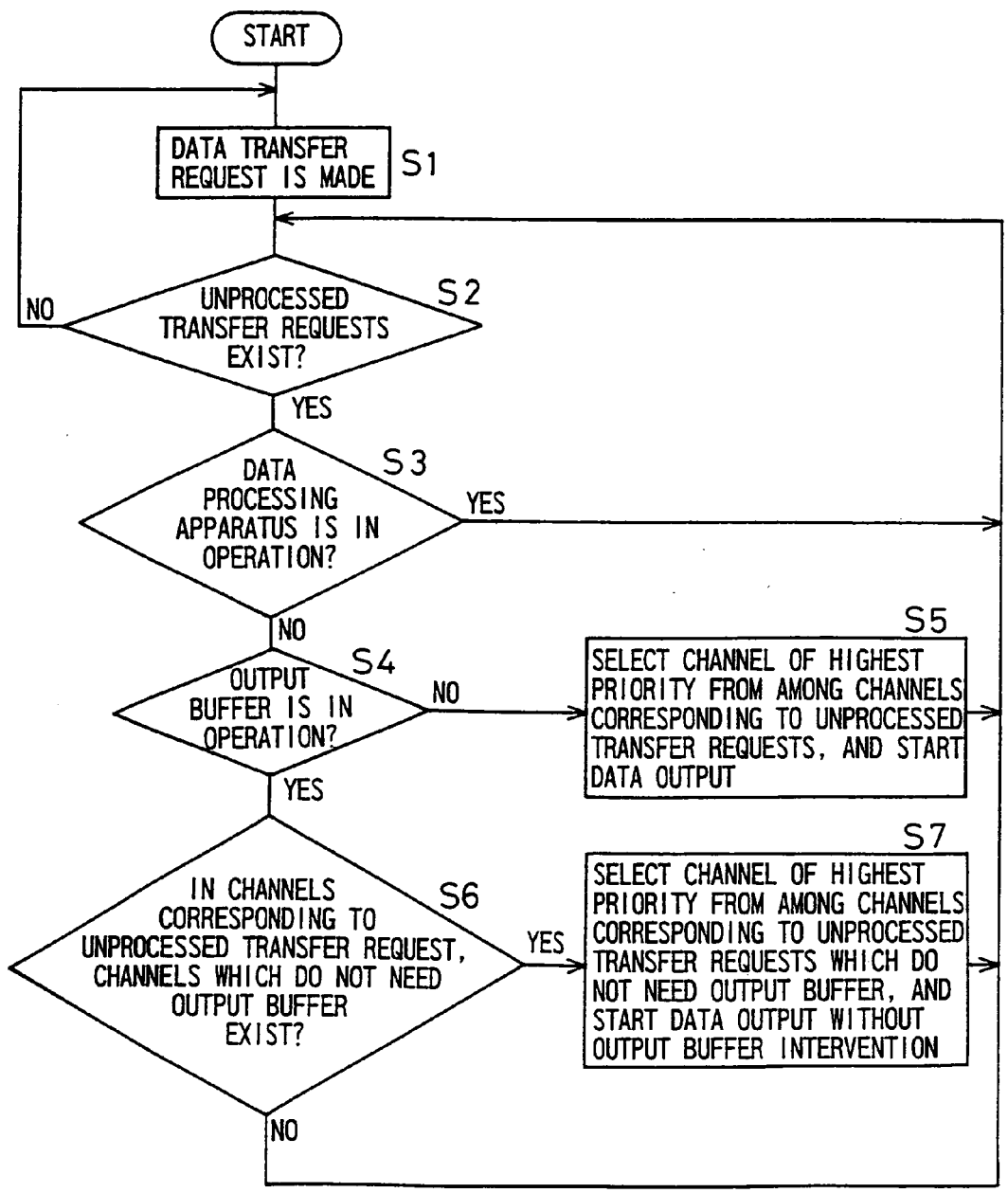

APPARATUS AND METHOD FOR TRANSFERRING DATA

BACKGROUND OF THE INVENTION

1. Field of the Invention

The present invention relates to a data transfer apparatus which selects a specific channel from among a plurality of channels connected thereto and transfers data from a data processing apparatus to the selected channel, and a data transfer method.

2. Description of the Related Art

In most cases, a conventional data transfer apparatus which is connected to a plurality of channels to perform data transfer comprises an output buffer because the data reception speed of the channels is lower than the data output speed of a data processing apparatus, and output data to the respective channels is once held in the output buffer and thereafter transferred to a selected channel. The data transfer apparatus of this type cannot respond to a data output request to another channel, although the data processing apparatus itself is not in operation during a period of time between completion of transfer from the data processing apparatus to the output buffer and completion of transfer from the output buffer to the channel, with the result that the operation efficiency of the data processing apparatus is lowered.

As a conventional method of enhancing the operation efficiency of the data processing apparatus in such a data transfer apparatus, there has been such a method as disposing output buffers to the respective channels and starting data transfer to another channel as soon as transfer from the data processing apparatus to the output buffer is ended, thereby enhancing the operation efficiency of the data processing apparatus.

However, in such a method as disposing output buffers to the respective channels, it is necessary to prepare a considerably large-scale circuit in the case where there are a large number of channels. Moreover, a channel which does not need an output buffer by nature because the data reception speed thereof is high and a channel used with low frequency are also provided with output buffers, so that the circuit becomes less efficient for the scale thereof.

A method of enhancing the efficiency of data transfer to a multi-number of channels without such a large-scale increase of circuits is disclosed in Japanese Unexamined Patent Publication JP-A 5-28082 (1993).

The method disclosed in JP-A 5-28082 aims to reduce the scale of a circuit by classifying a plurality of data input channels into high-speed channels and low-speed channels and making an output buffer for the low-speed channels in common.

However, this method relates to a data input circuit and therefore cannot be applied as it is to a data transfer apparatus related to data output. Moreover, a buffer and a control circuit need to be designed in view of the properties of the respective channels, so-that the circuit becomes complex and less general-purpose.

SUMMARY OF THE INVENTION

An object of the present invention, which was made in order to solve the problems as mentioned above, is to provide a general-purpose data transfer apparatus which enhances the operation efficiency of a data processing apparatus without a large-scale increase of circuits and has the same interface with respect to respective channels.

The invention provides a data transfer apparatus which selects a specific channel among a plurality of channels connected thereto and transfers data from a data processing apparatus to the selected channel, the data transfer apparatus comprising:

an output buffer to which data from the data processing apparatus is inputted;

a data selection circuit for transferring, data which is inputted from the data processing apparatus through a first path with the output buffer intervention, to a first channel corresponding to the first path, and data which is inputted from the data processing apparatus through a second path without the output buffer intervention, to a second channel corresponding to the second path, which second channel is different from the first channel; and a transfer control circuit for carrying out data transfer control, in response to a data transfer request from the data processing apparatus, so that data from the data processing apparatus is transferred to the channels corresponding to the respective paths.

According to the invention, while transferring data to one channel via the output buffer, it is possible to transfer data to another channel directly, so that it is possible to perform data output to two channels and enhance the data processing efficiency.

Further, in the data transfer apparatus of the invention it is preferable that while data from the data processing apparatus is being transferred to the first channel by using the first path with the output buffer intervention, the transfer control circuit carries out data transfer control, in response to a request of data transfer without the output buffer intervention, from the data processing apparatus which has ended data input to the output buffer, so that data from the data processing apparatus is transferred to the second channel by using the second path without the output buffer intervention.

According to the invention, while data is being outputted from the output buffer to a channel, data output from the data processing apparatus to a channel is also performed, whereby the invention can enhance the operation efficiency of the data processing apparatus.

Furthermore, in the data transfer apparatus of the invention, it is preferable that when the first path with the output buffer intervention is not used, the transfer control circuit carries out data transfer control, in response to a request of data transfer without the output buffer intervention, from the data processing apparatus, so that data from the data processing apparatus is transferred to the second channel by using the second path without the output buffer intervention.

According to the invention, it is possible to increase the data transfer speed in the case where the output buffer is unnecessary.

Still further, the invention provides a data transfer method comprising selecting a specific channel among a plurality of channels and transferring data from a data processing apparatus to the selected channel, the data transfer method comprising:

a data transfer request receiving step of receiving a data transfer request from the data processing apparatus; and a data transfer step of, in response to a data-transfer-request received at the data transfer request receiving step, transferring data from the data processing apparatus to a first channel corresponding to a first path with an output buffer intervention or to a second channel corresponding to a second path without the output buffer intervention.

According to the invention, while transferring data to one channel via the output buffer, it is possible to transfer data to another channel directly, so that it is possible to perform data output to two channels and enhance the data processing efficiency.

Still further, in the data transfer method of the invention it is preferable that the data transferring method further comprises:

a second data transfer request receiving step of receiving, while data from the data processing apparatus is being transferred to the first channel by using the first path with the output buffer intervention, a request of data transfer without the output buffer intervention, from the data processing apparatus which has ended data input to the output buffer;

a second data transfer step of transferring data from the data processing apparatus, in response to the data transfer request received at the second data transfer request receiving step, to the second channel by using the second path without the output buffer intervention.

According to the invention, while data is being outputted from the output buffer to a channel, data output from the data processing apparatus to a channel can be also performed, whereby the invention can enhance the operation efficiency of the data processing apparatus.

Furthermore, in the data transfer apparatus of the invention, it is preferable that the data transfer method further comprises a third data transfer request receiving step of receiving a request of data transfer without the output buffer intervention, from the data processing apparatus, when the first path with the output buffer intervention is not used; a third data transfer step of transferring, in response to the data transfer request received at the third data transfer request receiving step, data from the data processing apparatus to the second channel by using the second channel without the output buffer intervention.

According to the invention, it is possible to increase the data transfer speed in the case where the output buffer is unnecessary.

BRIEF DESCRIPTION OF THE DRAWINGS

Other and further objects, features, and advantages of the invention will be more explicit from the following detailed description taken with reference to the drawings wherein.

FIG. 2 is a flow chart showing the operation of the data transfer apparatus according to the invention.

DETAILED DESCRIPTION OF THE PREFERRED EMBODIMENTS

Figure 1:
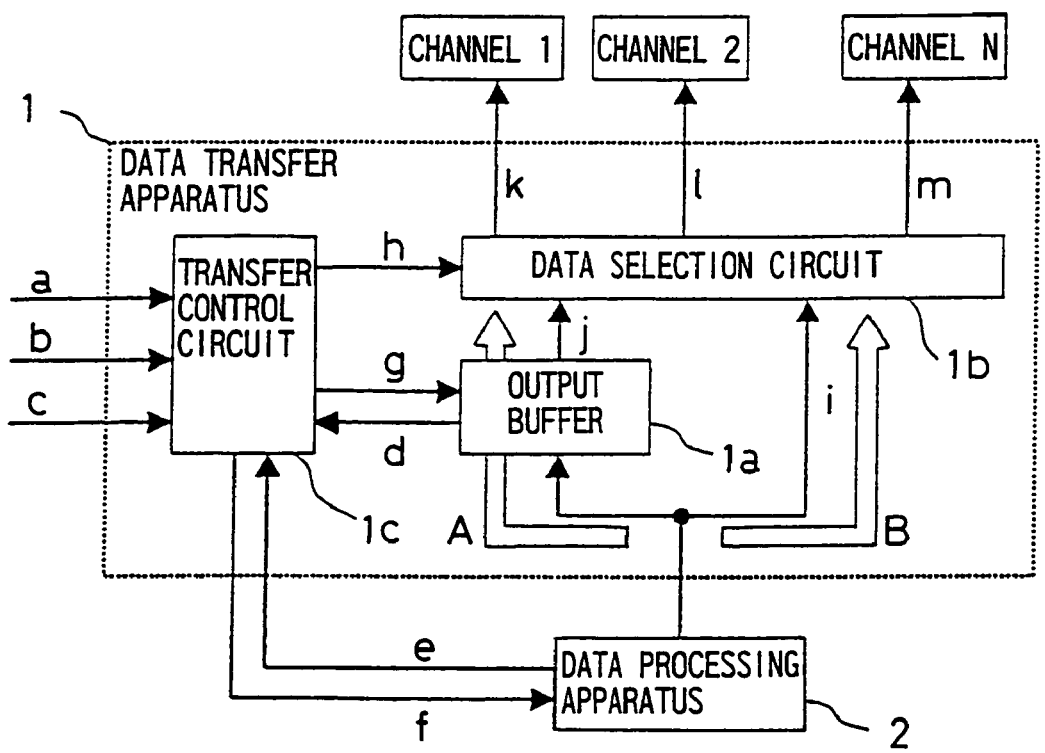
FIG. 1 is a block diagram showing an embodiment of a data transfer apparatus according to the present invention.

Now referring to the drawings, preferred embodiments of the invention are described below.

FIG. 1 is a block diagram showing a configuration of a data transfer apparatus of the embodiment. As shown in this diagram, the data transfer apparatus connects a data processing apparatus to a plurality of channels 1 to N and in response to a request, selects one of the plurality of channels 1 to N to transfer data from the data processing apparatus.

At first, the configuration of the data transfer apparatus will be illustrated.

As shown in FIG. 1, the data transfer apparatus 1 comprises an output buffer 1$a$, a data selection circuit 1$b$ and a transfer control circuit 1$c$.

The output buffer 1$a$ temporarily holds data processing apparatus output data i from the data processing apparatus 2 in accordance with an output buffer control signal g from the transfer control circuit 1$c$ and thereafter performs output to the data selection circuit 1$b$.

The data selection circuit 1$b$ transmits output buffer output data j and the data processing apparatus output data i, respectively, to one of the channels 1 to N in accordance with a data selection circuit control signal h from the transfer control circuit 1$c$.

The transfer control circuit 1$c$ is a circuit which generates control signals for the output buffer 1$a$, the data selection circuit 1$b$ and the data processing apparatus 2 on the basis of data transfer request signals a corresponding to the respective channels, buffer use request signals b, channel priorities c, output buffer state notification signals d and data processing apparatus state notification signals e.

Here, the data transfer request signals a are signals which are prepared for the number of the channels in correspondence to the respective channels, as well as signals which request for data transfer from the data processing apparatus 2 to corresponding channels. In a like manner, the buffer use request signals b are prepared for the respective channels to show whether or not transfer requests of the channels are the ones that need the output buffer. The channel priorities c are signals which set the priorities for the respective channels to perform processing in the case where a plurality of transfer requests are made at one time. Further, the output buffer state notification signals d and the data processing apparatus state notification signals e are signals which show the present operation states of the output buffer 1$a$ and the data processing apparatus 2, respectively.

Subsequently, referring to FIG. 2, the operation of the data transfer apparatus will be illustrated.

FIG. 2 is a flow chart showing the operation of the data transfer apparatus. As shown in this flow chart, when a data transfer request is inputted into the data transfer apparatus (S1), the transfer control circuit 1$c$ judges whether unprocessed transfer requests exist or not (S2). In the case where unprocessed transfer requests do not exist, the operation goes back to S1.

In the case where unprocessed data transfer requests exist, it is judged whether the data processing apparatus 2 is in operation or not (S3). In the case where the data processing apparatus 2 is in operation, the data output circuit cannot respond to a new transfer request, so that the operation goes back to S2.

In the case where the data processing apparatus 2 is not in operation, it is judged whether the output buffer 1$a$ is in operation or not (S4). In the case where the output buffer 1$a$ is not in operation, data transfer is not performed at the moment, so that a channel of the highest priority is selected from among channels corresponding to unprocessed data transfer requests to start data transfer from the data processing apparatus 2 to the selected channel (S5), and the operation goes back to S2. At this moment, on the basis of the buffer use request signal b corresponding to the selected channel, it is selected whether to use a first path A via the output buffer 1$a$ or a second path B without the output buffer intervention 1$a$ and the operations of the output buffer 1$a$ and the data selection circuit 1$b$ are controlled.

In the case where the output buffer 1$a$ is in operation, it is apparent that although transfer from the data processing apparatus to the output buffer 1$a$ is ended and the data processing apparatus 2 itself is not in operation, data transfer from the output buffer 1$a$ to a channel has not been completed yet. Therefore, it is subsequently judged whether or not transfer requests which do not need the output buffer 1a exist among the unprocessed transfer requests (S6). In the case where transfer requests which do not need the output buffer 1a do not exist, the operation goes back to S2 in this state.

In the case where transfer requests which do not need the output buffer 1a exist, a channel of the highest priority is selected from among the channels corresponding to the transfer requests to start data transfer from the data processing apparatus 2 to the channel by using the second path B without the output buffer intervention 1a (S7), and the operation goes back to S2.

As illustrated above, with the data transfer apparatus 1, in the case where the data processing apparatus 2 is not in operation, even when the output buffer 1a is being used, a transferred channel is selected from among channels corresponding to transfer requests which do not need the output buffer 1a, and data transfer is started, whereby the operation efficiency of the data processing apparatus 2 can be enhanced.

Further, the data output circuit 1 can be implemented only by adding a bypath and a control circuit without disposing another output buffer 1a, so that the operation efficiency of the data processing apparatus 2 can be enhanced with minimum increase of circuits.

Here, the data transfer request signals a, the buffer use request signals b and the channel priorities c shown in the embodiment may be inputted, respectively, from the side of the channels or from the side of the data processing apparatus 2. In the case of inputting from the side of the channels, the apparatus can operate as a slave-type data output circuit, whereas in the case of inputting from the data processing apparatus 2, the circuit can operate as a master-type data output circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data transfer apparatus which selects among a plurality of channels connected thereto and transfers data from a data processing apparatus to selected ones of the plurality of channels, the data transfer apparatus comprising:
   an output buffer to which data from the data processing apparatus is inputted;
   a data selection circuit for transferring, (i) selected portions of the data which are inputted from the data processing apparatus through a first path to a first channel, the first path extending through the output buffer, and (ii) selected other portions of the data which are inputted from the data processing apparatus through a second path without intervention by the output buffer, to a second channel, which second channel is different from the first channel; and
   a data transfer control circuit for carrying out data transfer control, in response to data transfer requests from the data processing apparatus, such that selected portions and selected other portions of the data from the data processing apparatus may be simultaneously transferred to the first and second channels;
   wherein while a selected portion of the data from the data processing apparatus is being transferred to the output buffer in the first path, the transfer control circuit carries out data transfer control so as to prevent data transfer by the data selection circuit to the second channel through the second path, and
   wherein in response to a request for the transfer of selected other portions of the data from the data processing apparatus without output buffer intervention made when the data selection circuit is not transferring data to the output buffer, selected other portions of the data from the data processing apparatus are transferred to the second channel using the second path without output buffer intervention and any data stored in the output buffer is simultaneously transferred to the first channel using the first path.

2. The data transfer apparatus of claim 1, wherein when the first path and the output buffer are not used, the transfer control circuit carries out data transfer control, in response to a request for data transfer without the output buffer intervention from the data processing apparatus, so that data from the data processing apparatus is transferred to the second channel using the second path without output buffer intervention.

3. A data transfer method comprising:
   selecting a specific channel among a plurality of channels; and transferring data from a data processing apparatus to the selected channel, the data transfer method further comprising:
   a data transfer request receiving step for receiving a data transfer request from the data processing apparatus; and
   a data transfer step for transferring, in response to a data transfer request, selected portions of the data from the data processing apparatus to a first channel through a first path, the first path containing an output buffer;
   a second data transfer request receiving step for receiving, a request for the transfer of other selected data portions from the data processing apparatus without output buffer intervention during periods when the data processing apparatus is not providing selected data portion input to the output buffer; and
   a second data-transfer step for in response to the data transfer request received at the second data transfer request receiving step transferring selected other portions of the data from the data processing apparatus to the second channel by using the second path without the output buffer intervention and simultaneously transferring any data then stored in the output buffer to the first channel by using the first path.

4. The data transfer apparatus of claim 3, further comprising:
   a third data transfer request receiving step for receiving a request for data transfer without output buffer intervention, from the data processing apparatus, when the first path containing the output buffer is not used; and
   a third data transfer step for transferring, in response to the data transfer request received at the third data transfer request receiving step, data from the data processing apparatus to the second channel by using the second channel without output buffer intervention.

5. A data transfer apparatus which selects a specific channel among a plurality of channels and in response to a request for data transfer transfers data from a data processing apparatus to the selected channel, the data transfer apparatus comprising:
   an output buffer for temporarily holding therein and thereafter outputting the data from the data processing apparatus;

a first path for transferring data to a channel with intervention by said output buffer;

a second path for transferring data to a channel without intervention by said output buffer;

a data selection circuit for connecting the first and second paths to different channels, respectively; and a transfer control circuit for controlling data transfer to the first and second paths, wherein in a case where data is to be output from the output buffer to a channel using the first path, when said transfer control ends a transfer of data from the data processing apparatus to the output buffer and in response to a request for data transfer the data processing apparatus is put into operation, the transfer control circuit causes data output to start using the second path.

6. The data transfer apparatus of claim 5, wherein in a case where the first path has not been previously used, the transfer control circuit causes data output from the data processing apparatus to start using the second path without intervention by the output buffer when a request for data transfer to a channel having a high priority does not require the output buffer.

7. A data transfer apparatus which selects a specific channel among a plurality of channels and transfers data from a data processing apparatus to the selected channel, comprising:

a data processing apparatus outputting a data processing apparatus state notification signal indicating an operation state of the data processing apparatus, an output buffer for temporarily holding therein in accordance with an output buffer control signal, and thereafter outputting, data from the data processing apparatus, the output buffer further outputting an output buffer state notification signal indicating an operation state of the output buffer;

a first path for transferring data to a channel with the intervention of said output buffer;

a second path for transferring data to a channel without the intervention of said output buffer;

a data selection circuit for connecting the first and second paths to different channels, respectively, in response to a data selection circuit control signal, and for transmitting to one of the different channels data from the data processing apparatus through the second path and transmitting to the other of said different channels data outputted from the output buffer through the first path; and a transfer control circuit for controlling data transfer to the first and second paths, wherein, in response to a data transfer request signal requesting data transfer from the data processing apparatus to a corresponding channel, a buffer use request signal is prepared for each channel indicating whether or not the data transfer request is a data transfer request that requires data transfer via the output buffer, a channel priority signal is prepared that sets a priority for each channel to receive data from said data processing apparatus in a case where a plurality of data transfer requests are made at one time, the output buffer state notification signal, and the data processing apparatus state notification signal are prepared, and the transfer control circuit generates the output buffer control signal provided to the output buffer, generates the data selection circuit control signal provided to the data selection circuit, and further generates a control signal provided to the data processing apparatus, wherein in a case where data is to be output from the output buffer to a channel using the first path, when said transfer control ends a transfer of data from the data processing apparatus to the output buffer and in response to a request for data transfer the data processing apparatus is put into operation, the transfer control circuit causes data output to start using the second path; and in a case where the data processing apparatus is not in operation and when the output buffer is not in operation, the transfer control circuit selects by means of the buffer use request signal whether the first or second path is used, controls the output buffer and the data selection circuit, and selects the channel having the highest priority from among channels corresponding to unprocessed data transfer requests to start receiving data from the data processing apparatus, and wherein in a case where the first path has not been previously used, the transfer control circuit causes data output from the data processing apparatus to start using the second path without intervention by the output buffer when a request for data transfer to a channel having a high priority does not require the output buffer.

* * * * *